United States Patent [19]

Sugiuchi et al.

[11] Patent Number: 4,496,638
[45] Date of Patent: Jan. 29, 1985

[54] SOLID-ELECTROLYTE CELL

[75] Inventors: Masami Sugiuchi; Atsuo Imai, both of Yokohama, Japan

[73] Assignee: Tokyo Shibaura Denki Kabushiki Kaisha, Kawasaki, Japan

[21] Appl. No.: 480,313

[22] Filed: Mar. 30, 1983

[30] Foreign Application Priority Data

Mar. 30, 1982 [JP] Japan .................................. 57-50196

[51] Int. Cl.³ .............................................. H01M 6/18
[52] U.S. Cl. .................................... 429/192; 429/213; 429/199; 429/218
[58] Field of Search ............... 429/192, 191, 199, 212, 429/213, 218

[56] References Cited

U.S. PATENT DOCUMENTS

| | | | |
|---|---|---|---|
| 3,352,720 | 11/1967 | Wilson et al. ....................... | 429/213 |
| 3,660,163 | 5/1972 | Moser .............................. | 429/213 X |
| 3,660,164 | 5/1972 | Hermann et al. ................. | 429/213 X |
| 3,674,562 | 7/1972 | Schneider et al. ................. | 429/192 |
| 4,049,890 | 9/1977 | Schneider .......................... | 429/192 |
| 4,333,996 | 6/1982 | Louzos .............................. | 429/213 |

Primary Examiner—Anthony Skapars
Attorney, Agent, or Firm—Oblon, Fisher, Spivak, McClelland & Maier

[57] ABSTRACT

A solid-electrolyte cell has an cathodic active material layer which includes a charge-transfer complex and a polymeric compound in which the charge-transfer complex is dispersed. The charge-transfer complex contains a certain type of naphthalene or tetracene derivative as an electron donor and iodine as an electron acceptor. A anodic active material layer including a light metal is formed in contact with the cathodic active material layer. A solid-electrolyte layer is formed in situ at the interface between the cathodic active material layer and the anodic active material layer by the reaction between the iodine and the light metal.

8 Claims, 4 Drawing Figures

SOLID-ELECTROLYTE CELL

BACKGROUND OF THE INVENTION

I. Field of the Invention

The present invention relates to a solid-electrolyte cell and, more particularly, to a solid-electrolyte cell which uses a light metal as an anodic active material and a charge-transfer complex as a cathodic active material.

II. Description of the Prior Art

Solid-electrolyte cells both prevent electrolyte leakage and allow easy packaging into small units, since they use solid electrolytes. For these reasons, solid-electrolyte cells are increasingly used in compact electronic equipment. A conventional cathodic active material for such a solid-electrolyte cell is a material which is a mixture of a metal with an inorganic iodide such as lead iodide or bismuth iodide. However, in the cell which uses such an inorganic iodide-based material as a cathodic active material, the electromotive force significantly changes with changes in temperature. Thus, the cell of this type cannot provide stable characteristics.

Another type of solid-electrolyte cell has been recently proposed which uses a charge-transfer complex containing iodine as an electron acceptor in place of the inorganic material as described above. In a cell of this type, a light metal as an anodic active material is in contact with the charge-transfer complex as the cathodic active material. The solid electrolyte is, in this case, a light metal iodide which is formed in situ at the interface between the anodic and cathodic active materials by the reaction between the light metal and the electron acceptor (i.e., iodine) of the charge-transfer complex. Since iodine is an electron acceptor, the voltage of the anodic active material is as high as about 2.8 V. Since the cathodic active material is itself a charge-transfer complex, it has electron conductivity. Furthermore, since iodine is taken in within the structure of the charge-transfer complex, the iodine vapor pressure is reduced and corrosion of the cell materials is reduced to the minimum. For these reasons, a charge-transfer complex containing iodine as an electron acceptor is expected to be a promising cathodic active material.

Known examples of an electron donor which, together with iodine, constitutes the charge-transfer complex include nitrogen-containing compounds such as phenothiazine, poly(2-vinylpyridine), 1-ethylpyridine, or tetramethylammonium; and polycyclic compounds such as pyrene or perylene. However, a charge-transfer complex containing one of these compounds as an electron donor and iodine as an electron acceptor does not provide satisfactory iodine vapor pressure and electron conductivity. Thus, such as charge-transfer complex will not in practice provide satisfactory characteristics (discharge properties and long service life of a cell) when used as a cathodic active material of a solid-electrolyte cell. Furthermore, most of these charge-transfer complexes have poor film formability and flexibility; films of these complexes easily crack during manufacture of cells, providing only a low manufacturing yield.

SUMMARY OF THE INVENTION

It is an object of the present invention to provide a solid-electrolyte cell which uses as a cathodic active material a charge-transfer complex containing iodine as an electron acceptor, which takes advantage of the good characteristics of the charge-transfer complex, allows discharge at a high efficiency, has a long service life, and provides a good manufacturing yield.

Broadly defined, a solid-electrolyte cell of the present invention uses a light metal as a anodic active material and a charge-transfer complex as a cathodic active material, the charge-transfer complex comprising iodine and a compound selected from naphthalene derivatives and tetracene derivatives respectively represented by the general formulas:

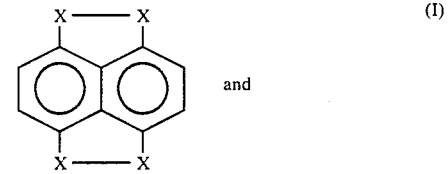

and

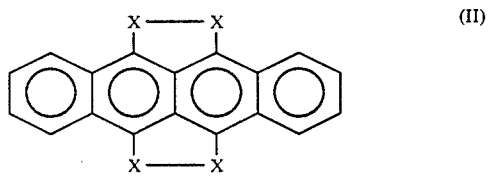

(wherein X is sulfur (S), selenium (Se) or tellurium (Te)). The cathodic active material is dispersed in a polymeric compound and is in contact with the anodic active material. The solid-electrolyte is a light metal iodide which is formed in situ at the interface between the cathodic and anodic active materials by the reaction between the light metal and the iodine.

In accordance with a most preferred embodiment of the present invention, the polymeric compound in which the charge-transfer complex is dispersed may be selected from polyvinylidene fluorides, copolymers of vinylidene fluoride with ethylene trifluoride or ethylene tetrafluoride, polyacrylonitriles, polyvinyl naphthalenes, polyvinyl anthracenes, and mixtures thereof.

The solid-electrolyte cells of the present invention provide a high discharge efficiency, a long service life, and a high manufacturing yield.

DETAILED DESCRIPTION OF THE PREFERRED EMBODIMENT

Figure 1:
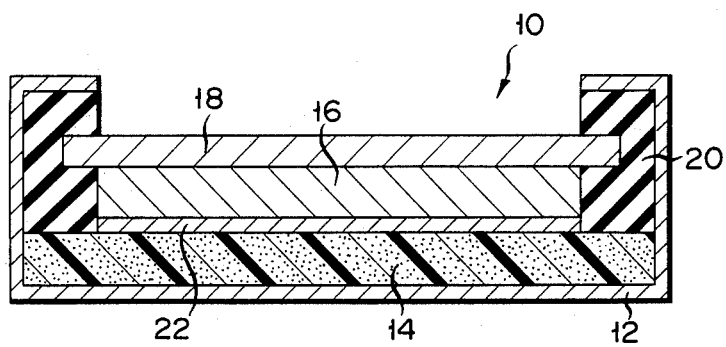
FIG. 1 is a sectional view of a solid-electrolyte cell according to an embodiment of the present invention.

According to an embodiment of the present invention shown in FIG. 1, a solid-electrolyte cell 10 has a container-like case 12 which is made of a conductor such as stainless steel. A cathodic active material layer 14 comprising a charge-transfer complex dispersed in a polymeric compound to be described later is held in the case 12 to be in contact therewith. The case 12 also serves as a cathodic collector.

An anodic active material layer 16 comprising a light metal is formed in contact with the cathodic active material layer 14. A lid 18 made of a conductor such as stainless steel and serving as an anodic collector is provided in contact with the cathodic active material layer 16.

A solid-electrolyte layer 22 is formed in situ, by a reaction to be described later, at the interface between the anodic and cathodic active material layers 14 and 16.

As has been described above, the charge-transfer complex contains iodine as an electron acceptor and, as an electron donor, a compound selected from naphthalene derivatives and tetracene derivatives respectively represented by the general formulas:

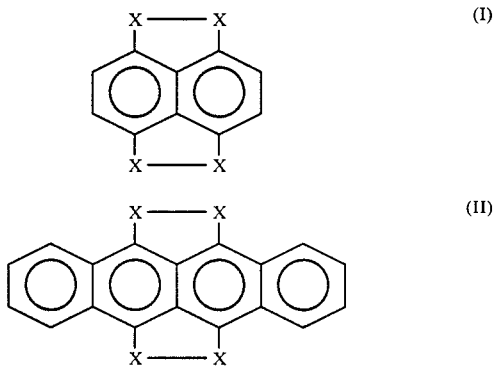

(wherein X is sulfur, selenium or tellurium).

In order to manufacture such a charge-transfer complex, iodine and a compound represented by general formula (I) or (II) are mixed in a suitable solvent such as nitrobenzene in an inert atmosphere such as argon. The molar ratio of the electron donor to iodine is 1:1.5 or more. The reaction temperature is about 150° to 250° C., and the reaction time is about 3 to 7 hours. After the reaction is completed, the reaction product is gradually cooled, and the precipitated solid product is separated to provide a desired charge-transfer complex.

The charge-transfer complex to be used herein has a higher electron conductivity and a lower iodine vapor pressure than the conventional charge-transfer complex. Therefore, a cell using the charge-transfer complex of the present invention has a high discharge efficiency and a long surface life. However, as is the case with the conventional charge-transfer complex, the charge-transfer complex of the present invention has poor film formability. If the charge-transfer complex of the present invention is directly formed into a film, the film is easily subject to significant cracking during manufacture of the cell, resulting in a low manufacturing yield of the cells.

In view of this, according to the present invention, the charge-transfer complex is dispersed in a polymeric compound. The polymeric compound must not degrade the characteristics of the charge-transfer complex dispersed therein and must have good compatibility therewith. It is to be noted that the polymeric compound must be able to form a flexible film as a support for the charge-transfer complex.

The polymeric compound in which the charge-transfer complex is dispersed is preferably selected from materials which have a high dielectric constant such as polyvinylidene fluorides, copolymers of vinylidene fluoride with ethylene trifluoroide or ethylene tetrafluoride, polyacrylonitrile, polyvinyl naphthalene, polyvinyl anthracene, and mixtures thereof.

The high dielectric constant of the polymeric compounds noted above leads to high electron conductivity, thereby limiting the decrease of an electrode voltage, and leads to high ion conductivity, thereby facilitating an electrode reaction. The polymeric compounds preferably have a dielectric constant of 4–5 or more. Among the preferred polymeric compounds exemplified above, polyvinyl naphthalene and anthracene do not have such a high dielectric constant, but are more compatible with the charge-transfer complex noted above.

The polymeric compound may further be polystyrene, polyvinyl chloride, vinyl chloride-vinyl acetate copolymer, polyvinyl acetate, polyvinyl acetal, phenolic resin, epoxy resin, alkyd resin or the like. However, from the viewpoint of preserving the cell characteristics, polymeric compound having a high dielectric constant as exemplified above are preferred.

In order to disperse the charge-transfer complex in the polymeric compound, the complex solution or dispersion as the reaction product as described previously is added to a solution of the polymeric compound and the solvent is volatilized; or the precipitated complex obtained from the above-noted reaction is added to a solution of the polymeric compound in an organic solvent, the resultant mixture is homogeneously mixed with a ball mill, a roller or the like, and the solvent is removed.

The mixing ratio of the charge-transfer complex to the polymeric compound is preferably such that the polymeric compound is contained in an amount of 5 to 30% by weight based on the weight of the complex. If the amount of the polymeric compound exceeds the upper limit of this range, the discharge characteristics of the cell are degraded. On the other hand, if the amount of the polymeric compound is below the lower limit, there is no appreciable effect from the addition of the polymeric compound.

The anodic material layer 16 may comprise any light metal such as an alkali metal, e.g., lithium (Li) or potassium (K); an alkaline-earth metal, e.g., beryllium (Be), magnesium (Mg), or calcium (Ca); and the like.

As has been described above, the solid-electrolyte layer 22 comprises a light metal iodide which is formed in situ at the interface between the anodic and cathodic active material layers 16 and 14 by the reaction between the iodine as the electron acceptor in the charge-transfer complex of the cathodic active material with the light metal of the anodic active material. Since the amount of the polymeric compound in the cathodic active material is smaller than that of the charge-transfer material dispersed therein, presence of the polymeric compound does not interfere with this reaction.

With recent advances in electronic equipment, a device which can operate with a current of several microamperes has been developed. The solid-electrolyte layer 22 to be assembled in such a device preferably comprises lithium iodide which has an ion conductivity at room temperature of about $10^{-7} \Omega^{-1} cm^{-1}$. In this case, the anodic active material 14 comprises lithium.

EXAMPLE

Tetrathiotetracene (X=S in general formula (II) above; to be referred to as TTT hereinafter), 0.1 mole, was reacted with 0.16 mole of iodine in nitrobenzene at 210° C. for 5 hours under an argon stream. The reaction product was cooled in decrements of 5° C. per minute. A black precipitate (TTT)$_2$I$_3$ was filtered and dried to provide a charge-transfer complex.

The charge-transfer complex, polyvinylidene fluoride and N,N-dimethylformamide were mixed in the amounts of 25 g, 5 g and 10 ml, respectively, in a ball mill. The resultant mixture was heated in a reduced pressure atmosphere and was thus dried. The dried material was pulverized, and 80 mg of the powder obtained was compressed into a disc having a diameter of 10 mm. The pellet thus obtained had satisfactory flexibility and did not yield upon bending as compared to a disc containing tetrathiotetracene and iodine alone. When used for a cell, the pellet may be cut or punched into a desired shape. The capacitance of the anode may be determined by adjusting the diameter, thickness and so on of the disc.

The charge-transfer complex thus obtained has a resistivity at 25° C. of $2.5 \times 10^2$ Ωcm and an iodine vapor pressure at 25° C. of 0.01 mmHg. A phenothiazine-iodine complex and a polyvinylpyridene-iodine complex conventionally used as cathodic active materials in conventional lithium/iodine charge-transfer complex cells have a resistivity of $10^5$ Ωcm and $10^3$ Ωcm, respectively. Thus, it is seen that the charge-transfer complex of the present invention provides a higher electron conductivity than these conventional complexes. The iodine vapor pressure, 0.3 mmHg, of the charge-transfer complex of the present invention is seen to be very low.

A cell as shown in FIG. 1 was assembled in a dry box using the above-mentioned pellet as a cathodic active material and a lithium disc of 10 mm diameter and 1 mm thickness as an anodic active material. The characteristics of the cell thus obtained were tested.

Figure 2:
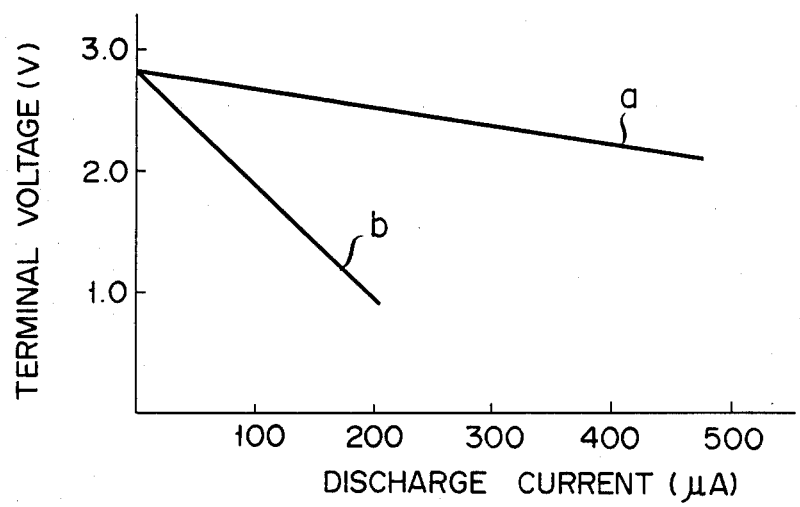
FIG. 2 is a graph showing the discharge current of the solid-electrolyte cell of the present invention as a function of the cell voltage, together with the same for a conventional solid-electrolyte cell.
Figure 3:
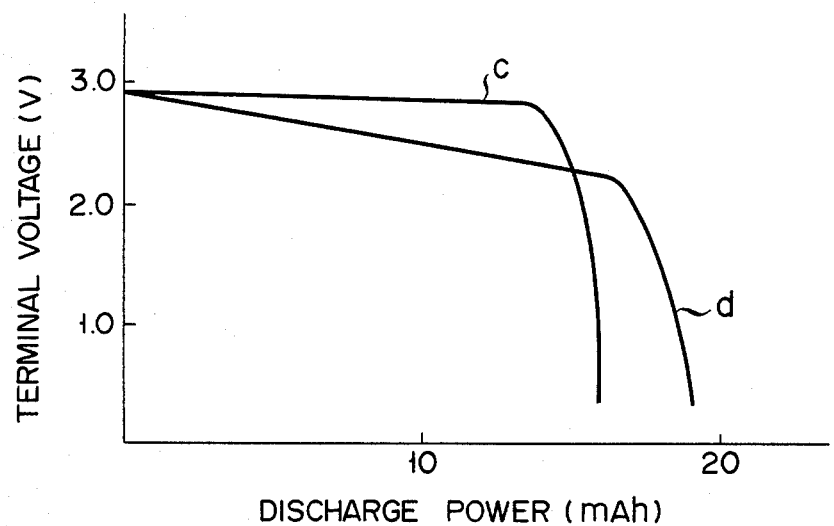
FIG. 3 is a graph showing the changes in voltage during discharge of the solid-electrolyte cell of the present invention, together with the same for the conventional solid-electrolyte cell.

FIG. 2 shows the relationship (curve a) between the discharge current of the cell and the cell voltage of the present invention, while FIG. 3 shows the voltage changes (curve b) during a 10 μA discharge. A similar test was also performed as a control for a control cell which used a charge-transfer complex which was obtained by adding 15 parts by weight of iodine to polyvinyl pyridine. FIGS. 2 and 3 also show curves b and d of the control cell.

Figure 4:
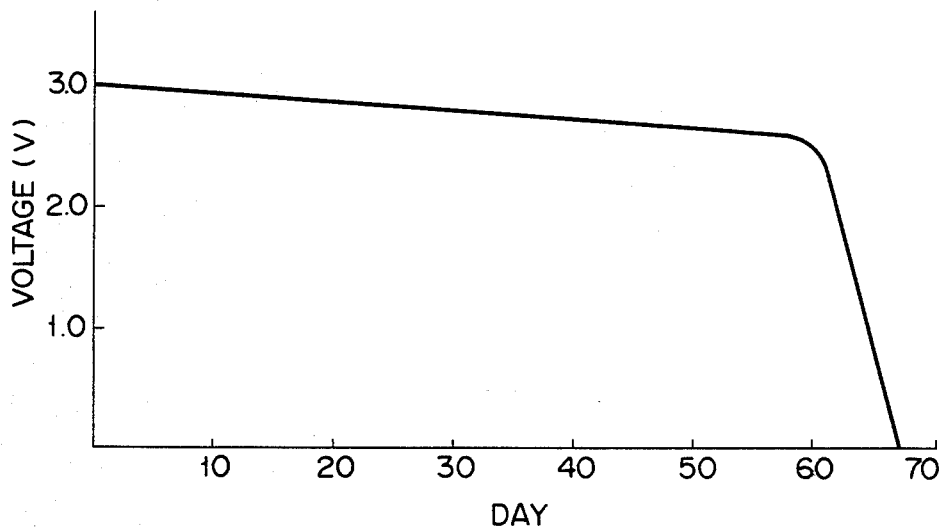
FIG. 4 is a graph showing the discharge characteristics of the solid-electrolyte cell of the present invention.

FIG. 4 shows the discharge characteristics of the cell according to the present invention when the cell was discharged at 25° C. and at a current of 10 μA/cell. As may be seen from this graph, the discharge voltage was stable within the range of 2.7 to 2.5 V for the cell of the present invention. The continuous discharge time at 2.6 V exceeded 60 days, providing an excellent service life.

In summary, a charge-transfer complex of the present invention contains a naphthalene or tetracene derivative used as an electron donor, and iodine as an electron acceptor. The charge-transfer complex is dispersed in a polymeric compound having a high dielectric constant such as polyvinylidene fluorides, copolymers of vinylidene fluoride with ethylene trifluoride or ethylene tetrafluoride, polyacrylonitriles; polyvinyl naphthalenes, polyvinyl anthracenes; and mixtures thereof. Therefore, the complex has a high electron conductivity and a low iodine vapor pressure. When such a charge-transfer complex is used as an anodic active material of a cell, the cell can discharge at a high efficiency and has a long service life.

What we claim is:

1. A solid-electrolyte cell comprising:
   a cathodic active material layer comprising a polymeric compound and a charge-transfer complex dispersed therein, the charge-transfer complex containing iodine as an electron acceptor and, as an electron donor, a compound selected from the group consisting of naphthalene and tetracene derivatives respectively represented by general formulas:

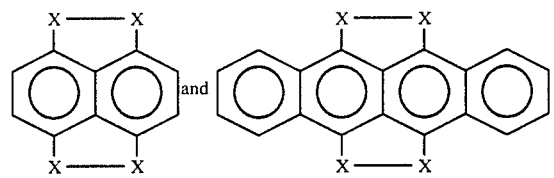

(wherein each X is sulfur, selenium or tellurium);
   an anodic active material layer which comprises a light metal and which is formed in contact with the anodic active material layer; and
   a solid-electrolyte layer which is formed in situ at an interface between the anodic and cathodic active material layers by a reaction between the iodine in the charge-transfer complex and the light metal.

2. A cell according to claim 1, wherein the polymeric compound is at least one member selected from the group consisting of polyvinylidene fluorides; copolymers of vinylidene fluoride with one of ethylene trifluoride and ethylene tetrafluoride; polyacrylonitriles; polyvinyl naphthalenes; polyvinyl anthracenes; and mixtures thereof.

3. A cell according to claim 1, wherein the cathodic active material layer contains 5 to 30% by weight of the polymeric compound based on the weight of the charge-transfer complex.

4. A cell according to claim 3, wherein the light metal is a member selected from the group consisting of lithium, potassium, beryllium, magnesium and calcium.

5. A cell according to claim 4, wherein the light metal is lithium.

6. A cell according to claim 3, further comprising a case which holds therein the cathodic active material layer in contact therewith and which functions as an anodic collector.

7. A cell according to claim 6, further comprising a lid which is in contact with the anodic active material layer, which is electrically isolated from the case, and which functions as a cathodic collector.

8. A cell according to claim 3, wherein the polymeric compound has a dielectric constant of 4 or more.

* * * * *